United States Patent [19]

Ikeda et al.

[11] Patent Number: 5,988,507
[45] Date of Patent: Nov. 23, 1999

[54] BAR CODE READER

[75] Inventors: Kenichi Ikeda; Kazuo Ishii, both of Tokyo, Japan

[73] Assignee: NEC Corporation, Japan

[21] Appl. No.: 08/962,857

[22] Filed: Nov. 3, 1997

[30] Foreign Application Priority Data

Nov. 1, 1996 [JP] Japan .................................. 8-307282

[51] Int. Cl.⁶ .................................................... G06K 7/10
[52] U.S. Cl. ............................... 235/462.25; 235/462.18
[58] Field of Search ........................ 235/462.12, 462.16, 235/462.18, 462.19, 462.25

[56] References Cited

U.S. PATENT DOCUMENTS

| 5,387,787 | 2/1995 | Waldron et al. | 235/462 |
| 5,780,832 | 7/1998 | Watanabe et al. | 235/462.25 |
| 5,854,479 | 12/1998 | Watanabe et al. | 235/462.16 |

FOREIGN PATENT DOCUMENTS

| 59-9946 | 3/1984 | Japan . |
| 64-86283 | 3/1989 | Japan . |
| 64-86284 | 3/1989 | Japan . |
| 2-170290 | 7/1990 | Japan . |
| 4-15774 | 1/1992 | Japan . |

Primary Examiner—F. L. Evans
Attorney, Agent, or Firm—Ostrolenk, Faber, Gerb & Soffen, LLP

[57] ABSTRACT

A fragmentary pulse width data train extractor scans a bar code label on a moving article with a scan beam projected onto the bar code label. The extractor receives the reflection of the scan beam, converts the reflected beam into an electric signal, and extracts only pulse width data trains corresponding to black and white bars of a bar code on the basis of the pulse width of the electric signal as fragmentary pulse width data trains. A synthesizing unit synthesizes a complete bar code pulse width data train from the extracted fragmentary pulse width data trains on the basis of position data of data pieces in the data trains, and outputs the complete bar code pulse width data train. A decoding unit converts the complete bar code plus width data train from the synthesizing unit into numerals, characters, etc. An outputting unit outputs the result of the conversion to an external apparatus.

7 Claims, 5 Drawing Sheets

IDENTITY
DEGREE A

IDENTITY
DEGREE B

IDENTITY
DEGREE C

BAR CODE READER

BACKGROUND OF THE INVENTION

The present invention relates to a bar code reader and, more particularly, to a bar code data train synthesis bar code reader for reading a bar code by synthesizing fragmentary pulse width data trains obtained through fragmentary scanning of the bar code.

In a prior art bar code data train synthesis bar code reader, fragmentary pulse width data trains obtained by one bar code scanning and the next scanning, i.e., two successive fragmentary pulse width data trains, are compared with each other, and a state in which the two data trains are most identical, i.e., a maximum identity degree state, is determined by shifting the data trains relative to each other for each go scanning. This state is used as a synthesis state, in which the two data trains are combined. With successive scannings, the resultant data train is successively extended, and finally a complete bar code data train containing the entire bar code is obtained.

Such bar code readers are disclosed in, for example, Japanese Patent Publication No. 59-9946, Japanese Laid-Open Patent Publication No. 64-86283, Japanese Laid-Open Patent Publication No. 64-86284, Japanese Laid-Open Patent Publication No. 2-170290, and Japanese Laid-Open Patent Publication 4-15774.

Figure 4:
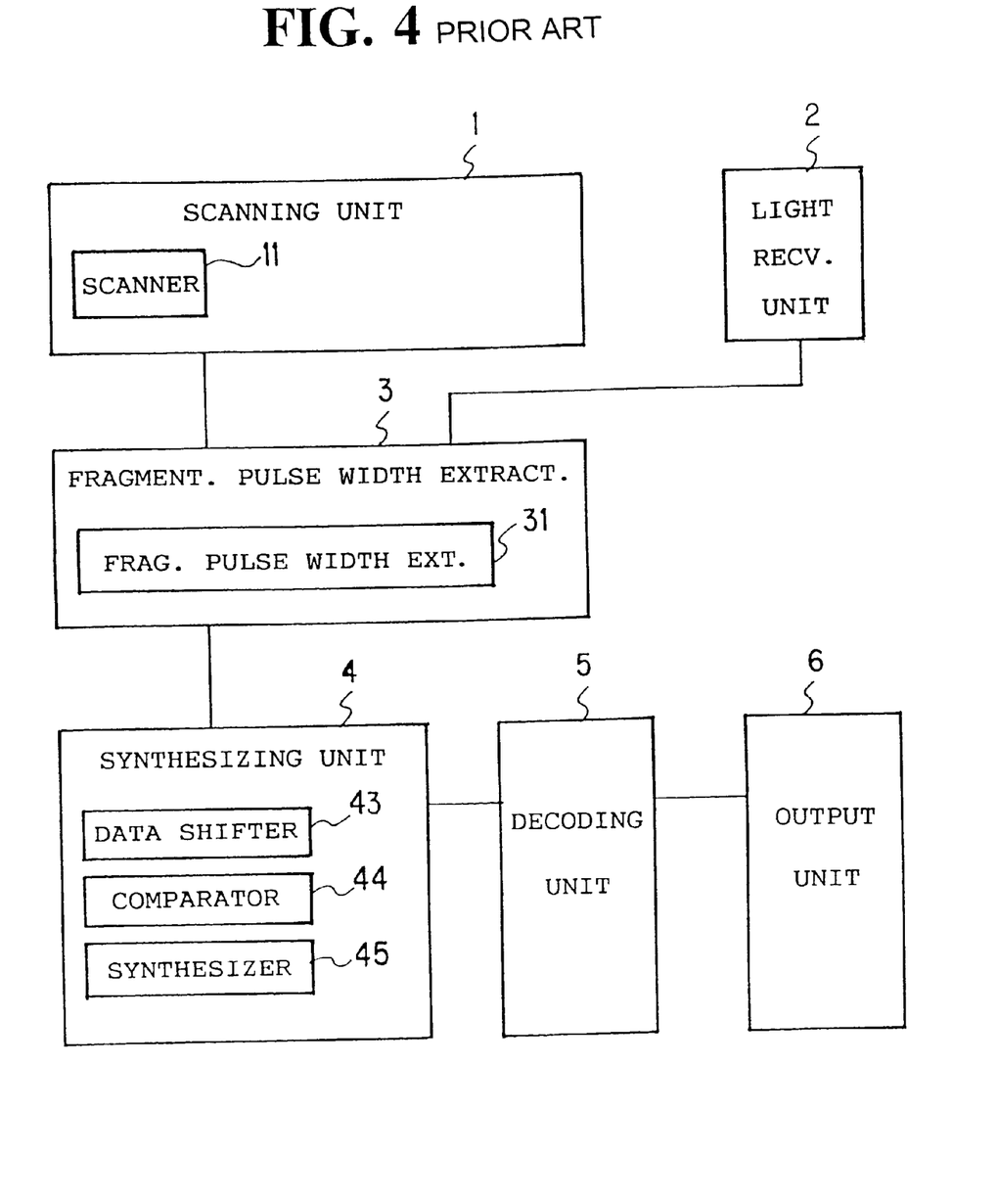
FIG. 4 is a block diagram of a prior art bar code reader.
Figure 5:
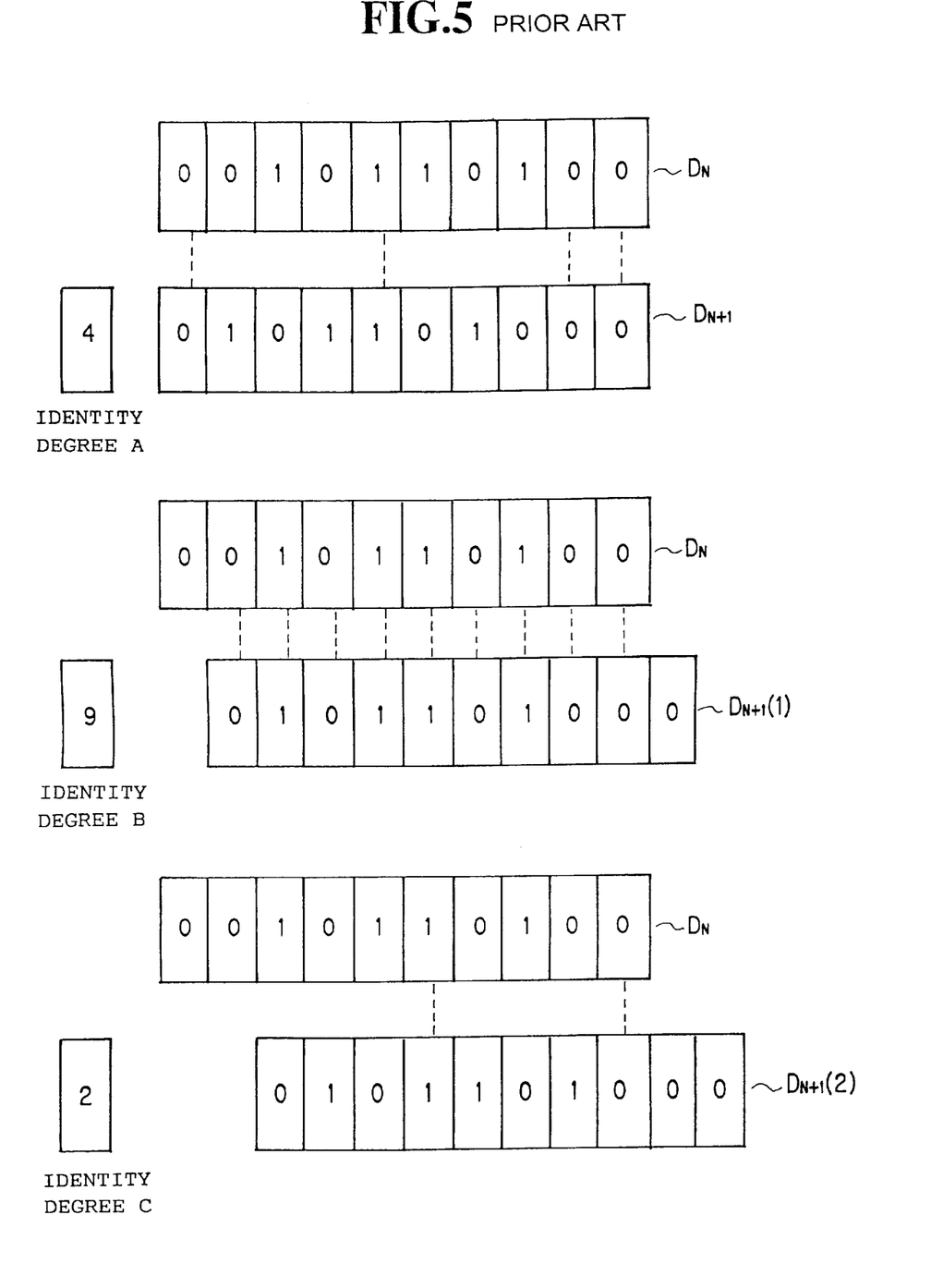
FIG. 5 is a drawing explaining the operation of the prior art bar code reader.

FIG. 4 is a block diagram showing a prior art bar code data train synthesis bar code reader. FIG. 5 is a view for describing a synthesis scheme in the prior art bar code data train synthesis bar code reader. In the prior art bar code data train synthesis bar code reader shown in FIG. 4, a fragmentary pulse width data train obtained as a result of one bar code scanning and one obtained as a result of the next scanning, are stored in a data shifter 43. A comparator 44 executes identify degree determination by comparing these fragmentary pulse width data trains. This comparing process is performed by shifting each data to determine the shift state which gives the maximum identity degree state, i.e., the synthesis state. A synthesizer 45 combines the two fragmentary pulse width data trains in the maximum identity degree state, and with successive scannings, the fragmentary pulse width data are successively extended to obtain a complete bar code data train containing the entire bar code.

The operation will now be described with reference to FIG. 5. As a result of comparison of an N-th and an (N+1)th scanning fragmentary pulse width data trains $D_N$ and $D_{N+1}$, identity degree A is obtained. As a result of comparison of the data train $D_{N+1}$. and a data train $D_{N+1}(1)$ which is obtained by shifting the data train $D_{N+1}$. to an extent corresponding to one bar code, identify degree B is obtained. As a result of comparison of the data train $D_{N+1}$. and a data train $D_{N+1}(2)$ which is obtained by shifting the data train $D_{N+1}$ to an extent corresponding to two bar codes, identity degree C is obtained. In the comparison, two vertically aligned binary data pieces of either "0" or "1", as shown in the figure, are compared. The identical degree is represented by the number of identical binary data is piece pairs. The binary data pieces of "0" or "1" in each fragmentary pulse width data train are actual pulse width data, with each representing a thin or a thick bar of a bar code. Specifically, the binary data piece of "0" represents a thin bar, and the binary data piece of "1" represents a thick bar.

The identity degree A, which is obtained without any data shift, is 4 in value; the identify degree B, which is obtained as a result of one-data-piece shift, is 9, the identity degree C; and which is obtained as a result of a two-data-piece shift, is 2. In this case, the maximum identity degree is obtained with one-data-piece shift. Synthesis is thus performed in one-data-piece shift state of one of the data trains which are used. That is, the N-th scanning fragmentary pulse width data train $D_N$ and the data train $D_{N+1}$ (1) obtained as a result of one-data-piece shift of the (N+1)-th scanning fragmentary pulse width data train $D_{N+1}$ are used for synthesis. The overlap of the (N+1)-th scanning fragmentary pulse width data train over the N-th scanning one, results in extension of the latter by one data piece. Successive fragmentary pulse width data trains are combined one after another with resultant successive data train extension, and in this way a complete bar code pulse width data train is obtained, which contains the entire bar code.

In the above prior art bar code data train synthesis bar code reader, the maximum identity degree state, i.e., the synthesis state, in which the fragmentary pulse width data trains are combined, is determined through comparison and shifting thereof on the basis of the pulse width data pieces in the data trains.

With fragmentary pulse width data obtained by scanning a bar code containing a succession of the same numerals or characters, the fragmentary pulse width data train that is obtained has a succession of the same patterns because of the scanning of the same pattern of black and white bars representing the same numeral or character. In this case, with the prior art bar code data train synthesis bar code reader, the maximum identity degree is increased by increasing the number of shifts since the synthesis state is obtained or the complete overlap is obtained by shifting by the recurring cycle portion of the pulse width data, i.e., a portion corresponding to one numeral or character on the bar code label. Therefore, it has been difficult to obtain a correct synthesis state. That is, with a bar code which contains a number of resembling portions, it is difficult to obtain a correct synthesis state and accurate reading of the bar code.

In the case of scanning a bar code label having a low height level, the obtained number of data pieces in each fragmentary pulse width data train is reduced, and consequently the identity degree is reduced. This means that the regular synthesis state is not substantially different from the other states, thus making it difficult to obtain a correct synthesis state.

SUMMARY OF THE INVENTION

An object of the invention is to provide a bar code reader, which can solve the above problem and provide a correct synthesis state, thus resulting in improved reading performance.

According to an aspect of the present invention, there is provided a bar code reader comprising: a fragmentary pulse width data train extracting unit for scanning a bar code label on a moving article with a scan beam projected onto the label, receiving reflection of the scan beam, converting the received beam into an electric signal, and extracting only pulse width data trains corresponding to black and white bars constituting a bar code on the basis of the pulse width of the electric signal as fragmentary pulse width data trains; a synthesizing unit for synthesizing a complete bar code pulse width data train synthesized from the fragmentary pulse width data trains on the basis of scanning position data corresponding to individual pulse width data pieces in the data trains, and outputting the obtained complete bar code pulse width data train; a decoding unit for converting the complete bar code pulse width data train from the synthesizing unit into numerals, characters, etc.; and an outputting unit for outputting the result of the conversion to an external apparatus.

According to another aspect of the present invention, there is provided a bar code reader comprising: a scanning unit for fragmentarily scanning a bar code on a bar code label on an article being moved on a conveyer or the like with a scan beam projected from a scanning window onto the bar code label; a light receiving unit for receiving the reflected light of the scanning beam and converting it into an electrical signal; a fragmentary pulse width data train extracting unit for measuring the pulse width of the electric signal and extracting only pulse width data trains corresponding to black and white bars constituting the bar code as fragmentary pulse width data trains; a synthesizing unit for synthesizing a fragmentary pulse width data trains extracted by the fragmentary pulse width data train extracting unit and outputting the synthesized one as a complete bar code pulse width data train; a decoding unit for converting the complete bar code pulse width data train from the synthesizing unit into numerals, characters, etc.; and an outputting unit for outputting the result of conversion in the decoding unit to an external apparatus;

the scanning unit including a scanning times counter for up-counting right before the projection of the scan beam out of the scanning window, and a scan beam angle counter for being cleared right before the projection of the scan beam from the scanning window and up-counting whenever a predetermined period of time has passed; the fragmentary pulse width data train extracting unit including a scanning start detector for receiving the fragmentary pulse width data trains from the fragmentary width data train extracting unit, detecting the last scanning of the bar code by the scan beam to output the scanning times count at this moment as a scanning end scanning times count, while also providing the scan beam angle count corresponding to the black bar end position in that fragmentary pulse width data train indicative of the bar code end, a scanning times/bar address generator for outputting scan times count data from the instant of the start of fragmentary bar code scanning by the scanning start detector till the instant of detection of the end of fragmentary bar code scanning by the scanning end detector, while also outputting scan beam angle counts corresponding to black and white bar start positions in the fragmentary pulse width data trains constituting the bar code as bar addresses, a bar address change computer for outputting the quotient of division of the difference between the scanning start and end black bar addresses by the difference between the scanning start and end scanning times counts as a bar address change, and a module change computer for outputting the quotient of division of the sum of module numbers of the black and white bars constituting the bar code by the difference between the scanning start and end scanning times counts; the synthesizing unit including an identical bar computer for determining a bar, which is in a fragmentary pulse width data train obtained from the fragmentary pulse width data train extractor by continual scanning of the bar code by the scan beam and at an address spaced apart from the scanning start black bar address by the bar address change, and a bar, which is at a position spaced apart from the position of a black bar corresponding to the scanning start black bar address by the module change, to be identical with each other, and outputting data representing the identical bar, and a synthesizer for receiving the output of the identical bar computer from the instant of the fragmentary bar code scanning start detection by the scanning start detector till the end of the fragmentary bar code scanning end detection by the scanning end detector, and synthesizing the complete bar code data train from the fragmentary pulse width data trains Other objects and features will be clarified from the following description with reference to attached drawings.

PREFERRED EMBODIMENTS OF THE INVENTION

Embodiments of the present invention are described with reference to the drawings.

Figure 1:
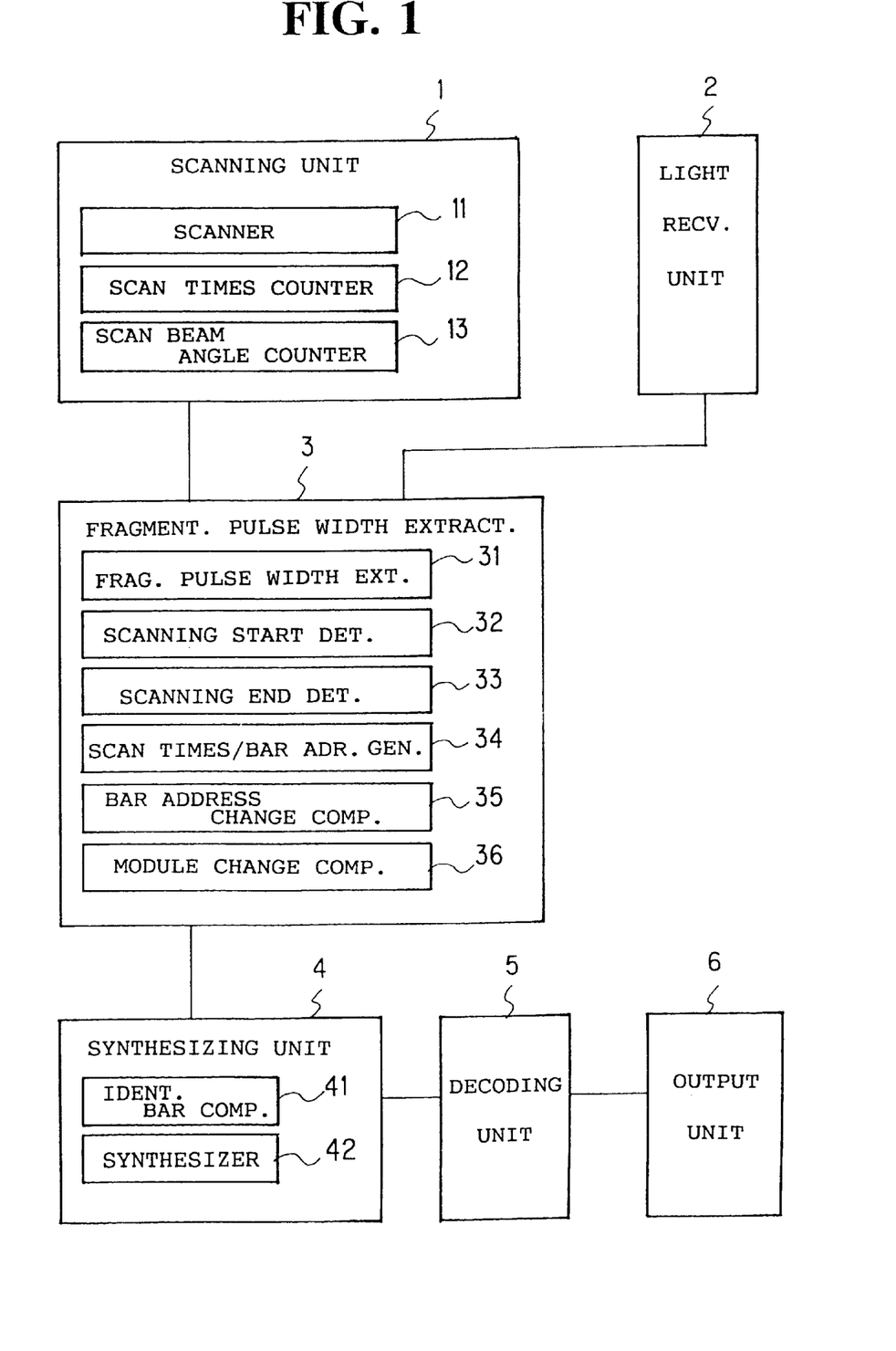
FIG. 1 is a block diagram showing an embodiment of the bar code reader of the present invention.

FIG. 1 is a block diagram showing an embodiment of the invention. Referring to the figure, the illustrated bar code reader comprises a scanning unit 1 for fragmentarily scanning a bar code with a scanning beam, which is projected from a scanning window onto the bar code label provided on an article conveyed on a conveyer or the like, a light-receiving unit 2 for receiving a reflected scan beam and converting the received beam into an electric signal, a fragmentary pulse width data train extracting unit 3 for measuring the pulse width of the electric signal and extracting only pulse width data trains corresponding to black and white bars constituting the bar code as fragmentary pulse width data trains, a synthesizing unit 4 for synthesizing a complete bar code pulse width data train from the fragmentary pulse width data trains and outputting the synthesized data train, a decoding unit 5 for converting the complete bar code pulse width data train outputted from the synthesizing unit 5 into data, such as letters, numerals, etc, and an outputting unit 6 for outputting the data of the reading to an external apparatus.

The scanning unit 1 includes a scanner 11 for generating the scan beam, a scanning times counter 12 for outputting scanning times count data, and a scan beam angle counter 13 for outputting scan beam angle data.

The fragmentary pulse width data train extractor 3 includes a fragmentary pulse width data train extractor 31 for extracting only fragmentary pulse width data trains corresponding to a state of fragmentary bar code scanning, a scanning start detector 32 for detecting the scanning start, a scanning end detector 33 for detecting the end of scanning, a scan times/bar address generator 34 for outputting the scanning times count data from the start to the end of scanning, and also outputting scan beam angle data corresponding to start positions of black and white bars of a bar code in a fragmentary pulse width data train as bar addresses of the black and white bars, a bar address change computer 35 for computing bar address changes in one scan at the scanning start and end, and a module change computer 36 for computing a change in one scan in the sum of module numbers of the black and white bars of a bar code to be read out.

The synthesizing unit 4 includes an identical bar computer 41 for computing positions of bars to be synthesized of adjacent scanning fragmentary pulse width data trains, and a synthesizer 42 for synthesizing a bar code pulse width data train from the start end of scanning.

Figure 2:
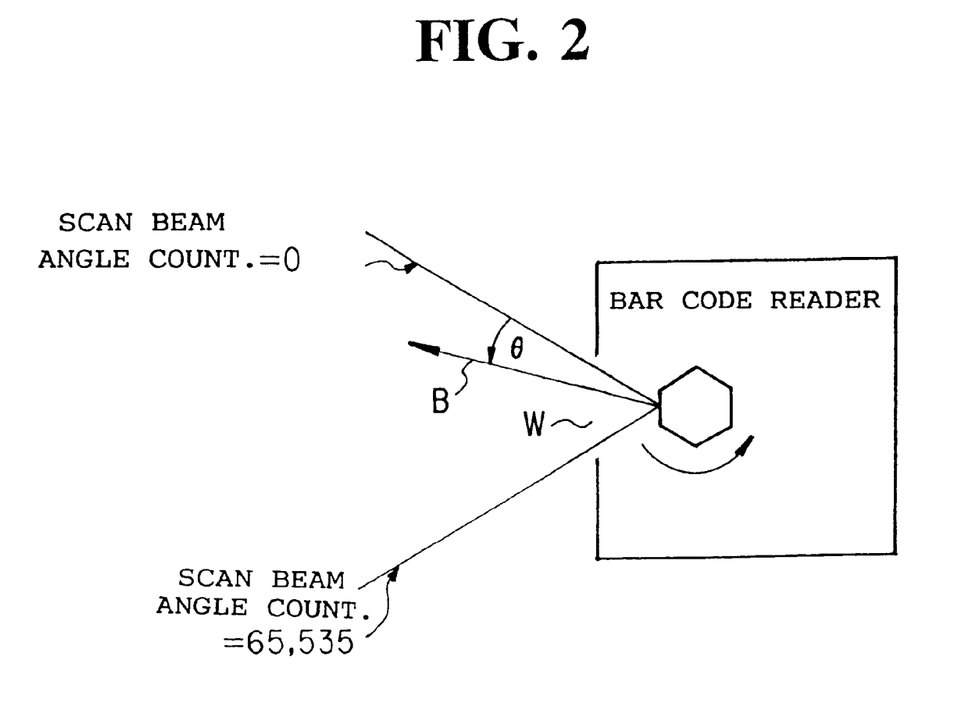
FIG. 2 is a drawing explaining the scan beam angle count operation of the bar code reader in FIG. 1.

As shown in FIG. 2, the scan beam angle counter 13 is cleared right before a scan beam B is outputted from a scanning window W of the bar code reader, and starts up-counting after the lapse of a predetermined period of time. The scanning times counter 12 is a free-running counter, and starts up-counting when the scan beam angle counter 13 is cleared. The scan beam angle counter 13 is a 16-bit counter, and the scanning times counter 11 is an 8-bit counter. The count of the scan beam angle times counter 13 is increased, to be "0", "1", "2", with increasing scan angle θ of the scan beam B, which is outputted from the scanning window W as shown in FIG. 2. Since the scan beam angle counter 13 is a 16-bit counter, it up-counts to "65,535". Upon reaching of the count "65,535", the scan beam B enters the system again. The counter of the scanning times counter 12, which is be an 8-bit counter, is changed to "0", "1", "2", "3", . . . "255", "0", "1", "2", "3", . . . .

Figure 3:
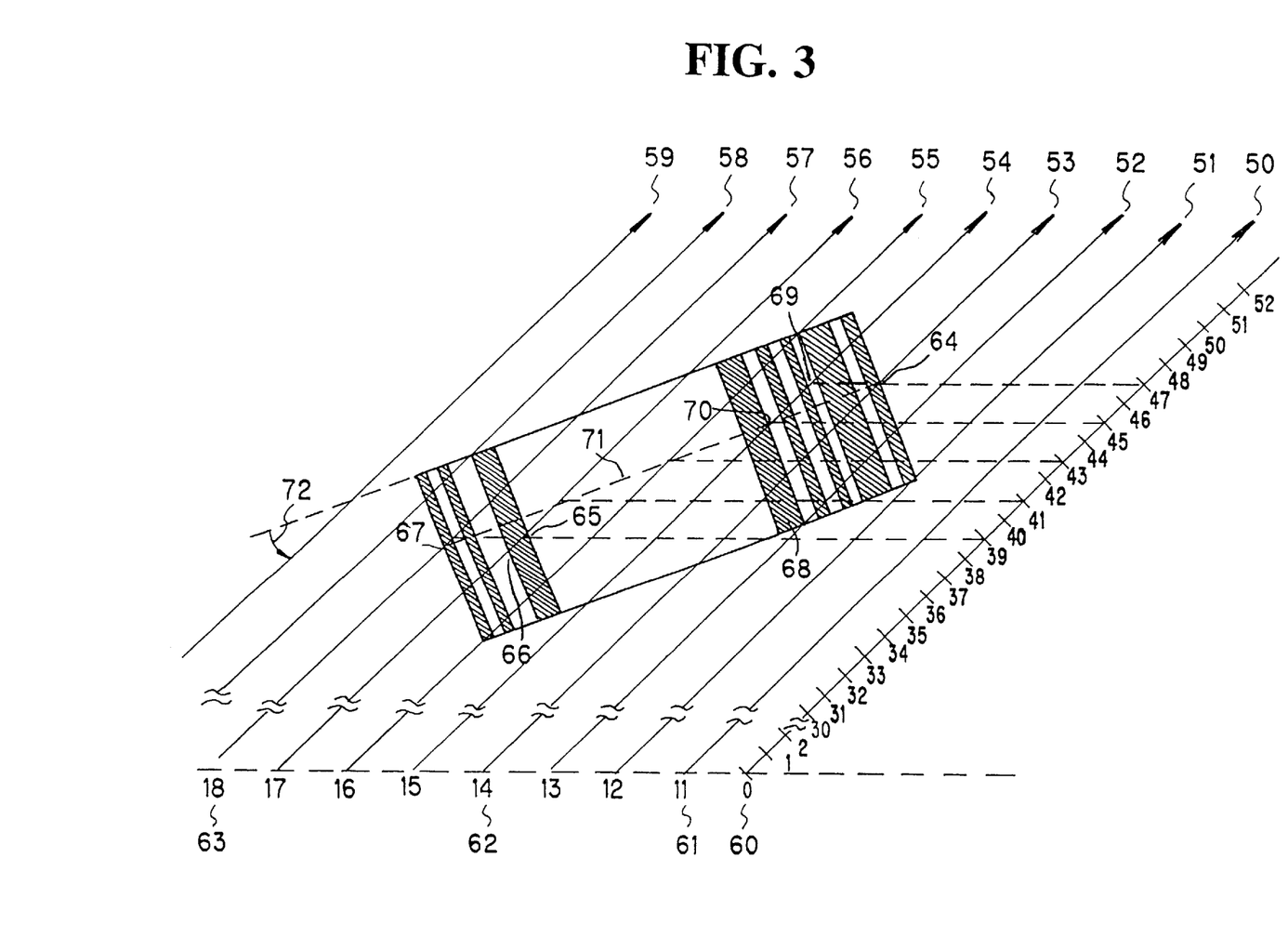
FIG. 3 is a drawing of scanning trains of a bar code label.

A case will now be considered, in which a moving bar code is scanned by the scanning unit 1. Specifically, as shown in FIG. 3, it is assumed that the bar code on a bar code label which is being moved at a fixed speed, is scanned by executing scanning along fixed scan lines 50 to 59 at an intersection angle 72. The bar code is actually scanned along scan lines from the line 53 to the line 57, and the fragmentary pulse width data train extractor 31 extracts fragmentary pulse width data trains corresponding to black and white bars on the bar code label while the bar code is scanned. Although the bar code is also scanned along the scan lines 52 and 58, the fragmentary pulse width data trains thereof have less data a pieces, and are insufficient in reliability as the regular fragmentary pulse width data trains. Therefore, the fragmentary pulse width data train extractor 31 discards these data trains. Specifically, a threshold data piece number is set, and data trains with less data piece numbers are discarded.

Thus, the fragmentary pulse width data train obtained by scanning along scan line 53 corresponds to the scanning start, and that obtained by scanning along scan line 57 corresponds to the scanning start. When the scanning end detector 32 detects the fragmentary pulse width data train of the scan line 53, it outputs a value (i.e., 14 in FIG. 3) as the scan times count 62 at the scanning start, and also outputs a scanning start black bar address value (i.e., 47) as the scan beam angle count 60 corresponding to a scanning start black bar start position 64 indicative of the bar code start in that fragmentary pulse width data train. When the scanning end detector 33 detects the fragmentary pulse width pulse width data train of the scan line 57, it outputs a value (i.e., 18) as the scanning times count 63 at the scanning end, and also outputs a scanning end black bar address value (i.e., 39) as the scan beam angle count 60 corresponding to a scanning end black bar end position 67 indicative of a bar code end in that fragmentary pulse width data train.

The scan times/bar address generator 34 outputs a scan times count 61 from the instant when the scanning start detector 32 detects the scanning start till the instant when the scanning end detector 33 detects the scanning end, and also it outputs scan beam angle counts 60 corresponding to a black and a white bar start positions 65 and 66 in the bar code in the fragmentary pulse width data train as the bar addresses.

The address change computer 35 obtains the difference (47−39=8) between the scanning start and end black bar addresses 64 (47) and 67 (39), and also the difference (18−14=4) between the scanning start and end scan times counts 62 (14) and 63 (18), and outputs the quotient of division of the former difference by the latter difference as a bar address change.

The module change computer 36 first obtains the sum of module numbers of thin and thick bars constituting the bar code to be read out. Usually, the kind and bit number of the bar code to be read out are set in the bar code reader, and the module change computer 35 obtains the module number sum from these settings. The bar code kind is assumed to be general NW-7 code, in which the bit number is 2, the thick-to-thin bar ratio is 2.5, and the inter-character gap is thick. In the NW-7 code, the start and stop codes each consist of 4 thin bars and 3 thick bars, and the characters each consist of 5 thin bars and 2 thick bars. The NW-7 code thus consist of 18 thin bars and 13 thick bars. As for the module number, since the thin bar has a module number of 1 and the thick bar has a module number ratio to the thin bar of 2.5, and module number sum is 1×18+2.5×13=50.5.

The module change computer 36 outputs the quotient (12.6) of division (50.5/4) of the module number sum (50.5) by the difference (18−14=4) between the scan start and end scan times counts 62 (14) and 63 (18) as the module change.

The identical bar computer 41 in the synthesizing unit 4 receives the bar address change output (2) from the bar address change computer 35 and the module change output (12.6) from the module change computer 36, and computes identical bars as synthesis positions to be overlapped in two adjacent scanning fragmentary pulse width data trains. For example, with the two adjacent scanning fragmentary pulse width data trains of the scan lines 53 and 54, the identical bar computer 41 first obtains a black bar 68, which is spaced apart by the module change amount (12.6) from the scanning start black bar start position 64 on the scan line 53. The identical bar computer 41 then obtains a bar, which is spaced apart by the address change amount (2) from a position 69 of the same address as the scanning start black bar start position 64 in the fragmentary pulse width data train in the scan line 54. This bar is identical with the black bar 68 in the fragmentary pulse width data train of the scan line 53 as obtained from the module change. This means that identical bars in two adjacent scanning fragmentary pulse width data trains of the scan lines 53 and 54 are obtained as a synthesis position.

With the two adjacent scanning fragmentary pulse width data trains of the scan lines 54 and 55, the identical bar computer 41 first obtains a bar spaced apart by the module change amount (12.6) from the position 70 of the scan line 54. The identical bar computer 41 then obtains a bar at a position spaced apart by the address change amount (2) from a position of the same address as the position 70 in the fragmentary pulse width data train of the scan line 54. This bar is identical with the bar in the fragmentary pulse width data train as obtained from the module change.

This is so because, as is obvious from a dashed line 71 in FIG. 3, a complete bar code is contained between the scanning start black bar start position 64 and the scanning end black bar end position 67 and that the individual scan lines uniformly divide the total module number constituting the bar code. The module number is independent of the intersection angle 72 between the scan lines and the bar code label. Thus, the identical bar computation is possible at any intersection angle except for 90 degrees. Usually, the intersection angle ranges from 0 to about 50 degrees.

The synthesizing unit 42 receives the output of the identical bar computer 41, and synthesizes the complete bar code data train from the fragmentary pulse width data trains obtained from the instant of the start till the instant of the end of the fragmentary bar code scanning.

As has been described in the foregoing, according to the invention a complete bar code is reconstituted by directly obtaining synthesis positions in fragmentary pulse width data trains without fragmentary pulse width data train comparison by data piece shifting but from bar address and module changes. Correct synthesis positions are thus obtainable even in the case of scanning a bar code label, which contains successive numerals or characters or is at a low height level. It is thus possible to realize a high performance bar code reader.

In the case where the start or stop character is scanned two successive times, the difference between the scan beam angle counts 60 with respect to the black bar corresponding to the bar code start in the two scan times, constitutes a deviation between the two fragmentary pulse width data trains, from which the complete bar code is to be synthesized. A synthesis scheme based on this difference is thus possible. According to this scheme, however, it is impossible to read a bar code label, which is at a low height level or is conveyed on a high speed conveyer, because it is necessary to scan the start or stop character two successive times.

According to the invention, the start or stop character need be scanned only once, and it is thus possible to realize a high performance bar code reader, which can read even a bar code label at a low height level or being conveyed on a high speed conveyor.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A bar code reader comprising:
   a fragmentary pulse width data train extracting unit scanning a bar code label on a moving article with a scan beam projected onto the label, receiving reflection of the scan beam, converting the received beam into an electric signal, and extracting only pulse width data trains corresponding to black and white bars of a bar code on the basis of the pulse width of the electric signal as fragmentary pulse width data trains, the fragmentary pulse width data train extracting unit further detecting an angle of the scan beam and generating scanning position data in response to the detected angle;
   a synthesizing unit synthesizing a complete bar code pulse width data train synthesized from the fragmentary pulse width data trains on the basis of the scanning position data corresponding to individual pulse width data pieces in the data trains, and outputting the obtained complete bar code pulse width data train;
   a decoding unit converting the complete bar code pulse width data train from the synthesizing unit into data; and
   an outputting unit outputting the data of the conversion to an external apparatus.

2. The bar code reader according to claim 1, wherein synthesis of the complete bar code pulse width data train on the basis of scanning position data, is by obtaining synthesis positions in two adjacent scanning fragmentary pulse width data trains, and outputting a complete bar code pulse width data train from a start character to a stop character by overlapping the synthesis positions.

3. The bar code reader according to claim 1, wherein of the fragmentary pulse width data trains obtained by bar code scanning with the scan beam, those with less amount of data than a predetermined amount of data are discarded without being used as the basis of the synthesis.

4. The bar code reader according to claim 1, wherein the scanning position data is determined on the basis of scan beam projection timings.

5. The bar code reader according to claim 1, wherein the fragmentary pulse width data train extracting unit includes a fragmentary pulse width data train extractor extracting only fragmentary pulse width data trains obtained while the bar code is fragmentarily scanned, a scanning start detector detecting the start of scanning of the bar code, a scanning end detector detecting the end of scanning of the bar code, a scanning times/bar address generator outputting scanning times count data from the start to the end of the scanning, and also outputting scan beam angle count data corresponding to black and white bar start positions in fragmentary pulse width data trains of the bar code, a bar address change computer computing bar address changes in one scan at the scanning start and end, and a module change computer computing a change in one scan in the sum of module numbers of the black and white numbers of the bar code.

6. The bar code reader according to claim 5, wherein the synthesizing unit synthesizes the complete bar code pulse width data train by obtaining the synthesis positions in the fragmentary pulse width data trains from the bar address changes and module changes.

7. A bar code reader comprising:
   a scanning unit fragmentarily scanning a bar code on a bar code label on an article being moved on a conveyer or the like with a scan beam projected from a scanning window onto the bar code label;
   a light receiving unit receiving the reflected light of the scanning beam and converting it into an electrical signal;
   a fragmentary pulse width data train extracting unit measuring the pulse width of the electric signal and extracting only pulse width data trains corresponding to black and white bars of the bar code as fragmentary pulse width data trains;
   a synthesizing unit synthesizing fragmentary pulse width data trains extracted by the fragmentary pulse width data train extracting unit and outputting the synthesized one as a complete bar code pulse width data train;
   a decoding unit converting the complete bar code pulse width data train from the synthesizing unit into data; and
   an outputting unit outputting the data of conversion in the decoding unit to an external apparatus;
   the scanning unit including a scanning times counter for up-counting before the projection of the scan beam out of the scanning window, and a scan beam angle counter being cleared before projection of the scan beam from the scanning window and up-counting whenever a predetermined period of time has passed;
   the fragmentary pulse width data train extracting unit including a scanning start detector receiving the fragmentary pulse width data trains from the fragmentary width data train extracting unit, detecting the last scanning of the bar code by the scan beam to output the scanning times count as a scanning end scanning times count, while also providing the scan beam angle count corresponding to the black bar end position in that fragmentary pulse width data train indicative of the bar code end, a scanning times/bar address generator outputting scan times count data from the start of fragmentary bar code scanning by the scanning start detector to detection of the end of fragmentary bar code scanning by the scanning end detector, while also outputting scan beam angle counts corresponding to black and white bar start positions in the fragmentary pulse width data trains of the bar code as bar addresses, a bar address change computer outputting a quotient of the difference between the scanning start and end black bar addresses by the difference between the scanning start and end scanning times counts as a bar address change, and a module change computer outputting a quotient of the sum of module numbers of the black and white bars of the bar code by the difference between the scanning start and end scanning times counts;

the synthesizing unit including an identical bar computer determining a bar, which is in a fragmentary pulse width data train obtained from the fragmentary pulse width data train extractor by continual scanning of the bar code by the scan beam and at an address spaced apart from the scanning start black bar address by the bar address change, and a bar, which is at a position spaced apart from the position of a black bar corresponding to the scanning start black bar address by the module change, to be identical with each other, and outputting data representing the identical bar, and a synthesizer receiving the output of the identical bar computer from the instant of the fragmentary bar code scanning start detection by the scanning start detector to the end of the fragmentary bar code scanning end detection by the scanning end detector, and synthesizing the complete bar code data train from the fragmentary pulse width data trains.

* * * * *